United States Patent Office 3,445,463
Patented May 20, 1969

3,445,463
3-(CYCLIC ACYL)OXYMETHYL
CEPHALOSPORINS
Earle M. Van Heyningen, Indianapolis, Ind., assignor to Eli Lilly and Company, Indianapolis, Ind., a corporation of Indiana
No Drawing. Continuation-in-part of application Ser. No. 184,511, Apr. 2, 1962. This application June 17, 1965, Ser. No. 464,844
Int. Cl. C07d 99/24; A61k 21/00
U.S. Cl. 260—243                                6 Claims

ABSTRACT OF THE DISCLOSURE

The invention is directed to derivatives of 7-acylamido-desacetylcephalosporanic acid which are useful antibiotic substances.

---

The present application is a continuation-in-part of my application Ser. No. 184,511, filed Apr. 2, 1962, now abandoned.

This invention relates to novel antibiotic substances and to methods for their preparation.

The novel compounds of this invention are 3-(cyclic acyl)oxymethyl cephalosporins represented by the following structural formulas:

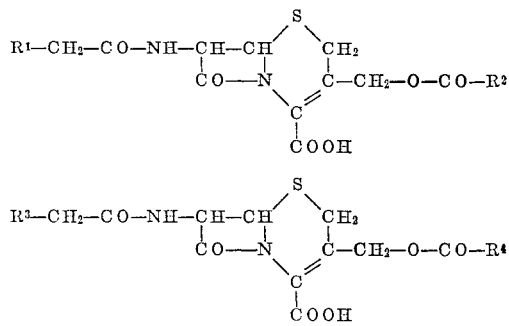

wherein $R^1$ is $C_1$–$C_{10}$ alkylmercapto, phenylmercapto, furyl, thienyl, benzofuryl, or benzothienyl;
$R^2$ is phenyl, naphthyl, furyl, thienyl, benzofuryl, or benzothienyl;
$R^3$ is phenyl or phenoxy; and
$R^4$ is furyl, thienyl, benzofuryl, or benzothienyl.

Illustrations of the various R groups appearing in the above formulas include the following: phenyl, phenoxy, phenylmercapto, 2-thienyl, 3-thienyl, 2-furyl, 3-furyl, 1-napththyl, 2-naphthyl, 2-benzothienyl, 3-benzothienyl, 2-benzofuryl, 3-benzofuryl, methylmercapto, ethylmercapto, n-propylmercapto, isoamylmercapto, n-decylmercapto, and the like.

The novel compounds of the present invention are 7 - acylamidodesacetylcephalosporanic acid compounds which have been esterified at the hydroxymethyl group with with an aryl or heterocyclic carboxylic acid or equivalent esterifying agent. They are obtainable in principle by exchange of the O-acetyl group of the 7-acylamidocephalosporanic acid compounds for the desired aryl or heterocyclic acyl group according to methods well known in the art. The novel compounds are useful antibiotic substances which can be administered in a conventional manner for the control of a wide range of gram-positive microorganisms. They are conveniently prepared and administered in the form of the salts of the carboxyl group with pharmaceutically acceptable cations, including, for example, water-soluble salts such as the sodium, potassium, lithium, ammonium, and substituted ammonium salts, as well as the less water-soluble salts such as the calcium, barium, procaine, quinine, and dibenzylethylenediamine salts.

The following examples, together with the operating examples appearing hereinafter, will illustrate the types of compounds available in accordance with the present invention:

7-phenylmercaptoacetamido-O-(3-thenoyl)cephalosporadesic acid
7-phenylacetamido-O-(3-furoyl)cephalosporadesic acid
7-(α-furylacetamido)-O-(2-naphthoyl)cephalosporadesic acid
7-(α-naphthylacetamido)-O-(2-benzothenoyl)cephalosporadesic acid
7-(2-benzothienylacetamido)-O-(2-benzothenoyl)cephalosporadesic acid.
7-methylmercaptoacetamido-O-(3-benzofuroyl)cephalosporadesic acid
7-(β-thienylacetamido)-O-benzoylcephalosporadesic acid
7-phenoxyacetamido-O-(2-thenoyl)cephalosporadesic acid
7-phenoxyacetamido-O-(2-furoyl)cephalosporadesic acid
7-n-butylmercaptoacetamido-O-(m-chlorobenzoyl)cephalosporadesic acid.

While the compounds of the present invention have been defined in terms of formulas which depict the structural features of the compounds and which indicate the presence therein of certain well known organic radicals, including alkyl, phenyl, naphthyl, furyl, thienyl, benzofuryl, and benzothienyl, it will be recognized by those skilled in the art that such radicals may bear one or more substituents without departing in any way from the spirit of the invention and without altering the properties of the compounds in such a way as to take them out of the scope of the invention. Compounds having the designated structure and bearing such substituents are accordingly to be considered as equivalents of the unsubstituted compounds and to be within the scope of the invention. Among such substituents are chlorine, bromine, fluorine, iodine, nitro, trifluoromethyl, $C_1$–$C_4$ alkyl, and $C_1$–$C_2$ alkoxy.

The source material for the compounds of the present invention is cephalosporin C, more precisely known as 7-(5'-amino-adipamido)cephalosporanic acid, which can be prepared by cultivating a cephalosporin C-producing organism in a suitable nutrient medium, as described in British patent specification 810,196, published Mar. 11, 1959.

Cephalosporin C is readily converted into the corresponding nucleus compound, 7 - aminocephalosporanic acid, by cleaving the 5'-amino-N'-adipamyl side chain between its amido carbonyl group and its amido nitrogen, suitably by reacting cephalosporin C with nitrosyl chloride in formic acid, then hydrolytically cleaving, according to the method of Morin et al. described in U.S. Patent 3,188,311 (June 8, 1965).

The nucleus thus obtained is conveniently converted into a 7-acylamidocephalosporanic acid as desired by acylation. For this purpose, any of the conventional acylation procedures can be employed, utilizing any of the various types of known acylating agents having the composition which yields the desired side chain. A convenient acylating agent is the appropriate acyl chloride or bromide. The acylation is carried out in water or an appropriate organic solvent, preferably under substantially neutral conditions, and preferably at reduced temperature, i.e., above the freezing point of the reaction mixture and up to about 20° C. In a typical procedure, 7-aminocephalosporanic acid is dissolved in water with a sufficient quantity of sodium bicarbonate or other appropriate alkali to promote solution, the concentration of the 7-aminocephalosporanic acid being about 1 to about 4 percent by weight. The solution is cooled to around 0 to 5° C., and a solution of the acylating agent is added in about 20 percent excess, with stirring and cooling. The pH of the mixture can be maintained, if it tends to vary, around the neutral level by bubbling carbon dioxide therein. After addition of the acylating agent has been completed, stirring of the reaction mixture is continued and the mixture is allowed to warm to room temperature. The reaction product is then acidified to around pH 2 and extracted with an organic solvent such as ethyl acetate. The ethyl acetate extract is back-extracted with water at pH 5.5 to 6, employing for pH adjustment a base containing the cation of the desired final product. The water solution is separated and evaporated substantially to dryness. The residue is taken up in a minimum quantity of water and the acylation product is precipitated by adding a large excess of acetone, and if necessary, ether. The crystalline product obtained thereby is filtered, washed with acetone, and dried.

The acylation can also be carried out with the corresponding carboxylic acid, employed in conjunction with an equimolar proportion of a carbodiimide such as N,N'-diisopropylcarbodiimide, N,N'-dicyclohexylcarbodiimide, N,N'-bis(p-dimethylaminophenyl)carbodiimide, N-ethyl-N'-(4''-ethylmorpholinyl)carbodiimide, or the like, and the acylation proceeds at ordinary temperatures in such cases. Alternatively, the carboxylic acid can be converted into the corresponding acid anhydride, or into the azide, or into an activated ester, and any of these derivatives can be used to effect the desired acylation. Other agents can readily be ascertained from the art.

In many cases, the acylating agent may contain one or more asymmetric carbon atoms and thus exist in optically active forms. When prepared by ordinary chemical means, such compounds are ordinarily obtained in racemic form—i.e., an equimolar mixture of the optical isomers, having no optical rotation. When the separate optical isomers are desired, the acylating agent can be resolved in a conventional manner such as by reacting the free acid with cinchonine, strychnine, brucine, or the like, then fractionally crystallizing to separate the diastereoisomeric salts, and separately acidifying the solid phase and the liquid phase to liberate the optical isomers. The free acids thus obtained can be employed as such for the acylation, preferably in conjunction with a carbodiimide, or may be converted by conventional means into the corresponding acid halide or into a mixed anhydride, care being exercised to avoid extremes of conditions which might produce racemization.

The 7-acylamidocephalosporanic acids obtained in the foregoing manner are conveniently converted into the corresponding 7-acylamidodesacetylcephalosporanic acids (referred to herein for convenience as "7-acylamidocephalosporadesic acids") by treatment with citrus acetylesterase for several hours in aqueous phosphate buffer at pH 6.5–7 according to the method of Jansen, Jang, and MacDonnell, Archiv. Biochem., 15, (1947), 415–31.

The compounds of the present invention are readily prepared by acylation of the hydroxymethyl group of the desired 7-acylamidocephalosporadesic acid starting material, employing appropriate acylating agents and procedures as described hereinabove. Many of the acylating agents, together with methods for their preparation, are described in the literature, and a number of them are commercially available. All of them are readily prepared by methods well known in the art.

The following is a typical acylation, in which a salt of 7-phenylmercaptoacetamidocephalosporadesic acid is converted into a salt of 7-phenylmercaptoacetamide-O-p-toluylcephalosporadesic acid, employing p-toluyl chloride as the acylating agent Example 1

Potassium 7-phenylmercaptoacetamidocephalosporadesate (300 mg., 0.000675 mole) was dissolved in a mixture of 7 ml. of water and 7 ml. of acetone and the solution was chilled in an ice-bath. To the chilled liquid was rapidly added a solution of 330 mg. (0.00213 mole) of p-toluyl chloride in 5.0 ml. of acetone with stirring, while aqueous 1 N sodium hydroxide solution was added from a buret at such a rate that the pH of the solution was maintained as nearly as possible between pH 8 and 9. This required rapid initial addition of the sodium hydroxide solution and dropwise addition toward the end of the reaction. When the pH leveled out at about pH 8, the reaction mixture was transferred to a round-bottom flask and evaporated under vacuum at room temperature to remove the acetone. This caused a solid to separate. Ethyl acetate was added (50 ml.) and, after vigorous shaking, the mixture was filtered to obtain the insoluble salt. The salt was placed in an Erylenmeyer flask, triturated with hot ethyl acetate (10 ml.), and filtered from the hot wash solution. The solid thus obtained was dried in a vacuum desiccator over calcium chloride, and was found to weigh about 200 mg. (0.000385 mole, 57 percent of theory), calculated as sodium 7 - phenylmercaptoacetamido-O-p-toluylcephalosporadesate.

The spectral and titration data of the product thus obtained are consistent with its expected structure. The ultraviolet spectrum showed a maximum at 240 m$\mu$ ($\epsilon$=25,400); the definitive infrared absorption bands were 1765$\mu$ ($\beta$-lactam), 1720$\mu$ (benzoate ester), 1668$\mu$ (amide I), and 1610$\mu$ (carboxylate). Titration of the salt in aqueous 66 percent dimethylformamide showed a p$K_a$ of 4.75 and an apparent molecular weight of 535 (520 calculated).

The products of the invention can be purified, if desired, by dissolving in hot methanol, diluting with isopropyl alcohol to the point of incipient precipitation, and cooling and crystallizing.

In an alternative purification method, the impure product is dissolved in aqueous acetone, chilled in an ice bath, acidified to pH 2 with hydrochloric acid, extracted with ethyl acetate, back-extracted into water at pH 5.5–6 with aqueous 1 N sodium hydroxide or potassium hydroxide, evaporated to dryness under vacuum, and recrystallized from methyl and isopropyl alcohols.

The invention will be more readily understood from the following additional operating examples, which are submitted as illustrations only, and not as limitations upon the scope of the invention.

Example 2

Potassium 7-phenylmercaptoacetamidocephalosporadesate (500 mg., 0.0012 mole) was dissolved in 15 ml. of water in a 150-ml. beaker. The solution was diluted with 15 ml. of acetone and chilled in an ice bath, and to it were added 1.360 g. (0.008 mole) of m-methoxybenzoyl chloride in 20 ml. of acetone, the addition being in two portions, followed by aqueous 1 N NaOH to around pH 8 after each portion. The acetone was evaporated from the reaction product mixture. The aqueous solution remaining was shaken with 50 ml. of ethyl acetate and about 5 ml. of saturated sodium chloride solution, then chilled. The resulting precipitate was filtered off, washed first with ethyl acetate, then with a few milliliters of saturated aqueous sodium chloride solution, and finally with a few milliliters of water, then dried in a vacuum desiccator. The yield was 175 mg. of sodium 7-phenylmercaptoacetamido - O - m - methoxybenzoylcephalosporadesate, 27 percent of theory. The ultraviolet absorption spectrum of the product showed a maximum at 241 m$\mu$ ($\epsilon$=16,000); the p$K_a$ was 4.78; and the molecular weight, by titration, was 532 (calc., 536).

The following compounds were prepared essentially by way of the method of Example 2:

Example 3

Sodium 7-phenylmercaptoacetamido-O-benzoylcephalosporadesate, 260 mg. (35.9 percent of theory), from 600 mg. of potassium 7-phenylmercaptoacetamidocephalosporadesate and 600 mg. of benzoyl chloride. The product had a $pK_a$ of 4.80, a molecular weight of 560 by titration (calc., 506), and an ultraviolet absorption maximum at 230 m$\mu$ ($\epsilon$=19,200).

Example 4

Sodium 7-phenylmercaptoacetamido-O-m-chlorobenzoylcephalosporadesate, 130 mg., from 500 mg. of potassium 7-phenylmercaptoacetamidocephalosporadesate and 750 mg. of m-chlorobenzoyl chloride. The product had a $pK_a$ of 4.75, a molecular weight of 554 by titration (calc., 540.5) and an ultraviolet absorption maximum at 230 m$\mu$ ($\epsilon$=16,000).

Example 5

Sodium 7-phenylmercaptoacetamido-O-p-chlorobenzoylcephalosporadesate, 250 mg. of impure product, from 600 mg. of potassium 7-phenylmercaptoacetamidocephalosporadesate and 750 mg. of p-chlorobenzoyl chloride. Recrystallization from methyl and isopropyl alcohols yielded a purified product weighing 110 mg. and having a $pK_a$ of 4.8, a molecular weight of 598 by titration (calc., 540.5), and an ultraviolet absorption spectrum having a maximum at 241 m$\mu$ ($\epsilon$=22,500) and an inflection at 260 m$\mu$.

Example 6

Sodium 7-phenylmercaptoacetamido-O-m-bromobenzoylcephalosporadesate, 310 mg. of impure product, from 500 mg. of potassium 7-phenylmercaptoacetamidocephalosporadesate and 1.750 g. of m-bromobenzoyl bromide. Recrystallization from methyl and isopropyl alcohols yielded a purified product weighing 100 mg. and having a $pK_a$ of 4.98, a molecular weight of 588 by titration (calc., 585), and a maximum in its ultraviolet absorption spectrum at 237 m$\mu$ ($\epsilon$=18,000).

Example 7

Sodium 7-phenylmercaptoacetamido-O-m-toluylcephalosporadesate, 340 mg. (50 percent of theory), from 600 mg. of potassium 7-phenylmercaptoacetamidocephalosporadesate and 660 mg. of m-toluyl chloride. The product had a $pK_a$ of 4.8, a molecular weight of 572 by titration (calc., 520), and a maximum in its ultraviolet absorption spectrum at 237 m$\mu$ ($\epsilon$=19,100).

Example 8

Sodium 7-phenylmercaptoacetamido-O-(3,5-dimethylbenzoyl)-cephalosporadesate, approximately 50 mg., from 500 mg. of potassium 7-phenylmercaptoacetamidocephalosporadesate and 1.350 g. of 3,5-dimethylbenzoyl chloride. The product had a $pK_a$ of 4.98, a molecular weight of 677 by titration (calc., 534), and a maximum in its ultraviolet absorption spectrum at 241 m$\mu$ ($\epsilon$=14,700).

Example 9

Sodium 7-phenylmercaptoacetamido-O-(3,5-dimethoxybenzoyl)cephalosporadesate, 260 mg. (38 percent of theory), from 500 mg. of potassium 7-phenylmercaptoacetamidocephalosporadesate and 1.600 g. of 3,5-dimethoxybenzoyl chloride. The product had a $pK_a$ of 4.90, a molecular weight of 615 by titration (calc., 566), and a maximum in its ultraviolet absorption spectrum at 251 m$\mu$ ($\epsilon$=16,500).

Example 10

Sodium 7-phenylmercaptoacetamido-O-(3,4,5-trimethoxybenzoyl)cephalosporadesate, 600 mg. of impure product, from 500 mg. of potassium 7-phenylmercaptoacetamidocephalosporadesate and 1.850 g. of 3,4,5-trimethoxybenzoyl chloride. Recrystallization from methyl and isopropyl alcohols yielded a purified product weighing 250 mg. and having a $pK_a$ of 4.83, a molecular weight of 625 by titration (calc., 596), and a maximum in its ultraviolet absorption spectrum at 262 m$\mu$ ($\epsilon$=18,000).

Example 11

Sodium 7-phenylmercaptoacetamido-O-(4-ethoxybenzoyl)cephalosporadesate, 200 mg. of impure product, from 500 mg. of potassium 7-phenylmercaptoacetamidocephalosporadesate and 1.475 g. of 4-ethoxybenzoyl chloride. Recrystallization from methyl and isopropyl alcohols yielded a purified product weighing 100 mg. and having a $pK_a$ of 4.77, a molecular weight of 608 by titration (calc., 550), and a maximum in its ultraviolet absorption spectrum at 258 m$\mu$ ($\epsilon$=23,700).

Example 12

Sodium 7-phenylmercaptoacetamido-O-(3,4,5-triethoxybenzoyl)cephalosporadesate, 60 mg., from 500 mg. of potassium 7-phenylmercaptoacetamidocephalosporadesate and 2.180 g. of 3,4,5-triethoxybenzoyl chloride. The product had a $pK_a$ of 4.88, a molecular weight of 631 by titration (calc., 594), and a maximum in its ultraviolet absorption spectrum at 249 m$\mu$ ($\epsilon$=20,000).

Example 13

Sodium 7-phenylmercaptoacetamido-O-(2-naphthoyl)-cephalosporadesate, 110 mg., from 500 mg. of potassium 7-phenylmercaptoacetamidocephalosporadesate and 810 mg. of 2-naphthoyl chloride. The product had a $pK_a$ of 4.8 and an ultraviolet absorption spectrum having maxima at 235 and 328 m$\mu$ and a shoulder at 258 m$\mu$ ($\epsilon$=54,100, 2,100, and 16,700, respectively).

Example 14

Sodium 7-phenylmercaptoacetamido-O - (2-thenoyl) cephalosporadesate, 140 mg., from 500 mg. of potassium 7-phenylmercaptoacetamidocephalosporadesate and 1.170 g. of 2-thenoyl chloride. The product had a $pK_a$ of 4.72, a molecular weight of 563 by titration (calc., 576), and an ultraviolet absorption spectrum having maxima at 250 and 340 m$\mu$ ($\epsilon$=18,800 and 420, respectively).

Example 15

Sodium 7-phenylmercaptoacetamido - O - (2-furoyl)-cephalosphoradesate, 360 mg. of impure product, from 500 mg. of potassium 7-phenylmercaptoacetamidocephalosporadesate and 1.040 g. of 2-furoyl chloride. Recrystallization from methyl and isopropyl alcohols yielded a purified product weighing 130 mg. and having a $pK_a$ of 5.05, a molecular weight of 488 by titration (calc., 496), and a maximum in its ultraviolet absorption spectrum at 252 m$\mu$ ($\epsilon$=19,700).

Example 16

Sodium 7-(2-thienylacetamido)-O-(5-bromo-2-furoyl) cephalosporadesate was prepared by reacting 500 mg. of potassium 7-(2-thienylacetamido)cephalosporadesate with 1.400 g. of 5-bromo-2-furoyl chloride essentially according to the procedure of Example 2.

The crude product, weighing 300 mg., was purified by acidifying in aqueous solution to approximately pH 2, extracting with ethyl acetate, back-extractig the ethyl acetate solution with aqueous 1N sodium hydroxide solution to about pH 6.0, evaporating the aqueous extract substantially to dryness under vacuum, and recrystallizing the residue from a mixture of methyl and isopropyl alcohols.

The purified product, weighing 57 mg., had ultraviolet absorption maxima at 238 m$\mu$ and 265 m$\mu$ ($\epsilon$=15,500 and 18,500, respectively).

Example 17

Sodium 7-(2-thienylacetamido) - O - benzoylcephalosporadesate was prepared by reacting 500 mg. of potassium 7-(2-thienylacetamido)cephalosporadesate with 390 mg. of benzoyl chloride essentially according to the procedure of Example 2.

The impure product, weighing 200 mg., was purified according to the procedure of Example 16.

The purified product, weighing 120 mg., had a $pK_a$ of 4.72, a molecular weight of 478 by titration (calc., 480), and a maximum in its ultraviolet absorption spectrum at 232 m$\mu$ ($\epsilon$=23,800).

Example 18

Potassium 7-(2-thienylacetamido)-O-benzoylcephalosporadesate was prepared by reacting 3.3 g. of potassium 2-thiopheneacetamidocephalosporadesate with 8.0 g. of benzoyl chloride essentially according to the procedure of Example 2, and the crude product was purified according to the procedure of Example 16.

The purified product, weighing 790 mg., had a $pK_a$ of 4.8, a molecular weight of 519 by titration (calc., 496), and a maximum in its ultraviolet absorption spectrum at 232 m$\mu$ ($\epsilon$=21,400).

Example 19

Sodium 7-(2-thienylacetamido)-O-(2-thenoyl)cephalosporadesate, 800 mg. of impure product, was prepared by reacting 1.0 g. of potassium 7-(2-thienylacetamido)-cephalosporadesic acid with 2.93 g. of 2-thenoyl chloride essentially according to the procedure of Example 2. Recrystallization from methyl and isopropyl alcohols yielded a purified product weighing 400 mg. and having a $pK_a$ of 4.70, a molecular weight of 482 by titration (calc., 486), and a maximum in its ultraviolet absorption spectrum at 240 m$\mu$ ($\epsilon$=18,400).

Example 20

Potassium 7 - (2 - benzofurylacetamido)cephalosporadesate (580 mg., 1.30 millimoles) was reacted with benzoyl chloride (580 mg., 4.12 millimoles) essentially under the conditions of Example 2.

The reaction product mixture was warmed and stripped of acetone under vacuum, during which operation a yellow precipitate formed. The resulting slurry was washed with ethyl acetate to remove any benzoic anhydride, and was then filtered. The yellow solid was washed with cold water, then with cold ethyl acetate, and dried, after which it was triturated with hot ethyl acetate to remove 7-(2-benzofurylacetamido)cephalosporadesolactone byproduct, and again dried. The impure product thus obtained weighed 385 mg., had a maximum in its ultraviolet absorption spectrum at 242 m$\mu$ ($\epsilon$=25,800), corresponding to 95 percent purity, and had maxima in its infrared absorption spectrum at 1772, 1727, 1668, 1616, 1551, and 1287 m$\mu$.

The impure product was dissolved in 50 ml. of hot methanol, filtered, and precipitated with 100 ml. of ether. The purified product thus obtained, after being filtered off and dried, weighed 181 mg. and had an antibiotic potency of 760 penicillin G units per milligram against *Staphylococcus aureus* 209 P, as determined by an appropriate modification of the paper disc plate methods of Higgines et al., Antibiotics and Chemotherapy, 3, 50–54 (January 1953) and Loo et al., Journal of Bacteriology, 50, 701–709 (1945).

The products of all of the foregoing examples can be converted into the free O-substituted 7-acylamidocephalosporadesic acids by dissolving the respective salts in water or aqueous acetone, acidifying to around pH 2 with hydrochloric acid, extracting with ethyl acetate, and evaporating the solvent under vacuum. If desired, the free acid can be converted into the salt of potassium, ammonium, or other appropirate cation by back-extracting the ethyl acetate extract with an aqueous solution of the corresponding base (potassium hydroxide, ammonium hydroxide, or the like). In all cases, the free acid as well as the salts are considered to life within the scope of the invention.

I claim:

1. An antibiotic substance of the class represented by the following formulas:

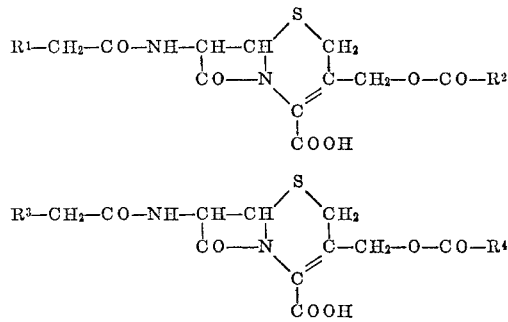

wherein $R^1$ is $C_1$-$C_{10}$ alkylmercapto, phenylmercapto, furyl, thienyl, benzofuryl, or benzothienyl;

$R^2$ is phenyl, naphthyl, furyl, thienyl, benzofuryl, or benzothienyl;

$R^3$ is phenyl or phenoxy; and $R^4$ is furyl, thienyl, benzofuryl, or benzothienyl; and the salts thereof with pharmaceutically acceptable cations.

2. 7 - phenylmercaptoacetamido-O-benzoylcephalosporadesic acid.

3. 7 - phenylmercaptoacetamido-O-(2-thenoyl)cephalosporadesic acid.

4. 7-phenylmercaptoacetamido-O - (2 - furoyl)cephalospordesic acid.

5. 7-(2-thienylacetamido)-O-benzoylcephalosporadesic acid.

6. 7-(2-benzofurylacetamido) - O - benzoylcephalosporadesic acid.

References Cited

UNITED STATES PATENTS 3,079,306   2/1963   Offe et al. _____ 260—243
3,117,126   1/1964   Hoover et al. _____ 260—243

OTHER REFERENCES

Abraham et al.: Endeavour, vol. XX, No. 78, pp. 92—100 (1961).

NICHOLAS S. RIZZO, *Primary Examiner.*

U.S. Cl. X.R.

424—246